(12) United States Patent
Lim et al.

(10) Patent No.: US 7,477,662 B2
(45) Date of Patent: Jan. 13, 2009

(54) REDUCING POWER CONSUMPTION IN DATA SWITCHES

(75) Inventors: Swee Hock Lim, Singapore (SG); Hong Lee Koo, Singapore (SG)

(73) Assignee: Infineon Technologies AG (DE)

( * ) Notice: Subject to any disclaimer, the term of this patent is extended or adjusted under 35 U.S.C. 154(b) by 923 days.

(21) Appl. No.: 10/366,982

(22) Filed: Feb. 14, 2003

(65) Prior Publication Data

US 2004/0160898 A1    Aug. 19, 2004

(51) Int. Cl.
    *H04L 12/26* (2006.01)
(52) U.S. Cl. ...................................... 370/522
(58) Field of Classification Search ................. 370/311, 370/522
    See application file for complete search history.

(56) References Cited

U.S. PATENT DOCUMENTS 5,404,544 A    4/1995  Crayford 6,993,667 B1*  1/2006  Lo ............................. 713/320
7,079,571 B1*  7/2006  Chen .......................... 375/219

OTHER PUBLICATIONS

M. Gupta et al., 'A Feasibility Study for Power Management in LAN Swithces', Oct. 2004, Proceedings of the 12th IEEE International Conference on Network Protocols, pp. 1-11.*

* cited by examiner

*Primary Examiner*—Melvin Marcelo
(74) *Attorney, Agent, or Firm*—Lerner, David, Littenberg, Krumholz & Mentlik, LLP

(57) ABSTRACT

A data switch 1 includes a switching engine 7, and input/output interfaces 5 which each connect the switching engine 7 to one of a number of channels. The input/output interfaces 5 and the switching engine 7 are each made up of a number of modules (PHY, MAC_RX, RX, MAC_TX, TX, PBM, ARL, QM). Some or all of the modules have a logic circuit for turning them on when they are required to process data packets passing through the circuit, and a logic circuit is provided for turning them off when they are no longer required. In this way the power requirements of the switch 1 are reduced.

10 Claims, 2 Drawing Sheets

REDUCING POWER CONSUMPTION IN DATA SWITCHES

FIELD OF THE INVENTION

The present invention relates to data switches such as Ethernet switches, and in particular to data switches having low power consumption.

BACKGROUND OF INVENTION

Traditionally data switches, such as Ethernet switches, which transmit data packets between input ports and output ports via a switching fabric have been operated as a component of a large computer apparatus having a reliable electrical power supply and a cooling system. More recently, however, applications for data switches have arisen in which it would be advantageous for the power requirement of the switch to be reduced. An example of such a system is an IP phone, in which data packets passing through the switch are data packets of a telephone conversation. The data switch for such devices is frequently provided within an apparatus which is hand-held or which is located in a furnished room. Excessive heat generation might make such a device uncomfortable to hold, or damage furniture which is located close to the apparatus. The excess heat might also damage the casing of the device. Furthermore, many telephones of conventional telephone systems draw their power from the telephone lines themselves, but this is only possible if the telephone requires only a low amperage. Thus, a data switch which requires a power supply greater than this level will only be useable as part of an IP telephone which has access to a separate power source.

SUMMARY OF THE INVENTION

The present invention aims to provide a new and useful data switch, and in particular one with a low power requirement.

In general terms the present invention proposes that depending upon the data packets passing through the switch, at least one module of the data switch which is not required to process the data packet(s) is turned off (i.e. when the module would otherwise be idle). This reduces the power consumption within the switch.

Specifically, one expression of the invention is a method of controlling a data switch which has a plurality of input/port ports and a switching engine, the input/output ports and the switching engine including modules for receiving and passing on data packets, the method including turning at least one of the modules off and on in dependence on the data packets passing through the switch.

Preferably, each of the modules which is turned off and on is associated with a logic circuit which registers signals transmitted to the module from one or more other modules of the switch. The signals are indicative of the presence of data packets passing through the switch, and the logic circuit is arranged to turn the module on based on the signals.

The signals are preferably the handshake signals present in conventional data switches.

The modules which are turned on and off are preferably associated with (e.g. include) a logic circuit for determining when the modules are to be turned off, based on when all the packets which have arrived at the module have all been transmitted and the condition that there are no further packets arriving. Note that this logic circuit can optionally be the same logic circuit mentioned above which turns the module on.

Preferably, the modules of the switch are turned on or off by enabling or disabling transmission to them of a clock signal.

The invention may alternatively be expressed as a data switch including at least one module which may be turned off and on as described above.

BRIEF DESCRIPTION OF THE FIGURES

Preferred features of the invention will now be described, for the sake of illustration only, with reference to the following figures in which.

DETAILED DESCRIPTION OF THE EMBODIMENTS

Figure 1:
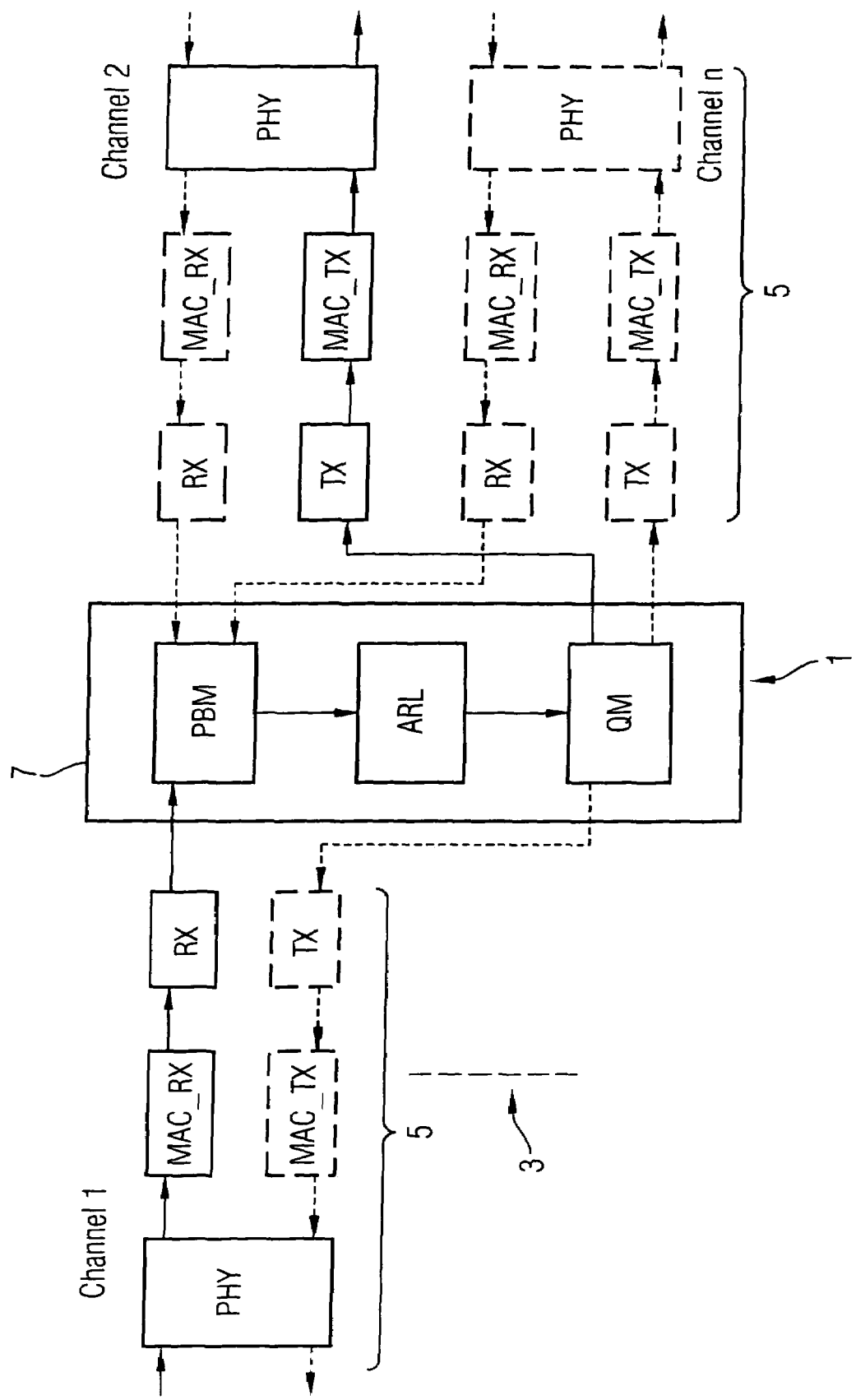
FIG. 1 shows the structure of a data switch which is an embodiment of the present invention.

FIG. 1 illustrates the general structure of a data switch 1 which is an embodiment of the present invention. Ethernet data switches having this form are already well known, but as discussed below the operation of the various modules illustrated in FIG. 1 is different from that of the corresponding modules of known Ethernet switches.

The data switch 1 is for receiving data packets from, and transmitting data packets to, n channels, where n is an integer greater than 1. In FIG. 1 a first channel "channel 1" is shown on the left, a second channel "channel 2" is shown on the right, and further channels are indicated by the dots 3. The n-th channel is marked as "channel n".

The data switch 1 comprises a respective interface 5 connected to each corresponding channel. Each interface 5 is treated as an input port in respect of packets arriving at the switch from the corresponding channel, and as an output port in respect of packets transmitted from the switch to the corresponding channel. Each interface 5 includes a physical module PHY in contact with the channel. The next layer is the MAC (media access controller) unit, composed of a MAC receive module MAC_RX and a MAC transmit module MAC_TX. When a packet is received by the PHY, it is passed to the corresponding MAC_RX, and from there to a respective receive module RX which provides buffering.

From there the data packet is transmitted to a switching engine 7 where it is stored or processed. The switching engine 7 may be made up of three other blocks, namely the ARL (address resolution logic), the PBM (packet buffer and its manager) and the QM (queue manager). The ARL is used to process the header of each incoming data packet to determine the output port(s) to which the switch should direct that data packet. The PBM stores the packets until the switching engine 7 is ready to send them to the output port(s). The QM (queue manager) is needed when the data packets are sequenced in an orderly manner (i.e. queued) in respective queues for each corresponding output port. The output path of the packets is made up of the TX buffer module of the respective interface 5, the transmit module MAC-TX of the MAC unit of the respective interface 5, and finally of the PHY of the respective interface 5 which is connected to the respective channel. The operation of all the above modules is already known to a skilled reader, and hence will not be described here in further detail.

Ethernet traffic is generally bursty. During periods in which there is zero traffic, the embodiment shuts down the switch, or that part of the switch which is not needed to process any packets. This is done as follows based on signals transmitted between the modules, to obtain a correct synchronisation of the shutting down and powering up of the various modules.

The switch 1 operates based on a clock signal, and each module of the switch is preferably powered up or powered down simply by respectively turning on or off the transmission of the clock signal to it.

In general, the transfer of data packets between the modules is performed by a handshaking protocol. In this case, there is no need for the switch-on signals referred to above to be signals which do not exist in existing switching systems. Instead, each of the modules may be provided with a simple logic circuit to monitor the handshake signals transmitted to that module, and in the case that the handshake signals indicate that a packet is to be transmitted to that module, the power up is performed. For example, the logic circuit may be arranged to ensure that any interruption in the passage of the clock signal to the corresponding module is removed.

In this embodiment the PHY is permanently turned on. However, in other embodiments of the invention it is possible for at least part of the PHY to be turned on/off so as to be off for at least part of the time at which it is not required.

When a packet is first detected on an incoming line, the corresponding PHY is arranged to generate a CRS (carrier sense) signal, or a RX-DV (receive data valid) signal if it uses a MII (media independent interface) interface with the MAC module. In either case, the signal transmitted to the MAC-RX module is recognised by a logic circuit which arranged to control the MAC-RX module of the corresponding MAC, and this logic circuit turns the MAC-RX module on (if it is not already on). Once the MAC is ready to transfer the packet to the respective RX module, it transmits a signal to the RX module which is recognised by a logic circuit associated with the RX module, and this logic circuit turns the RX module on (if it is not on already). Similarly, when the RX module is ready to transfer the packet to the switching engine 7, it transmits a signal to the switching engine 7, and this signal is recognised by a logic circuit associated with the switching engine which turns the switching engine 7 on (if it is not on already).

As well as the MAC-RX module being arranged to power up upon its logic circuit recognising a handshake signal from the PHY module, is associated with (e.g. includes) a logic circuit which controls it to power down automatically when the entire packet has been transferred to the corresponding RX module (and only in the case that it receives no new power up signal from the corresponding PHY before completing the transfer). Similarly, the RX module is arranged to power up upon its logic circuit recognising a handshake signal from the MAC_RX portion of the MAC module, and is arranged to power down when a logic circuit associated with the MAC_RX portion recognises that the entire packet has been transferred out of the RX module (and only in the case that it receives no new power up signal from the corresponding MAC module before this transfer is completed).

Figure 2:
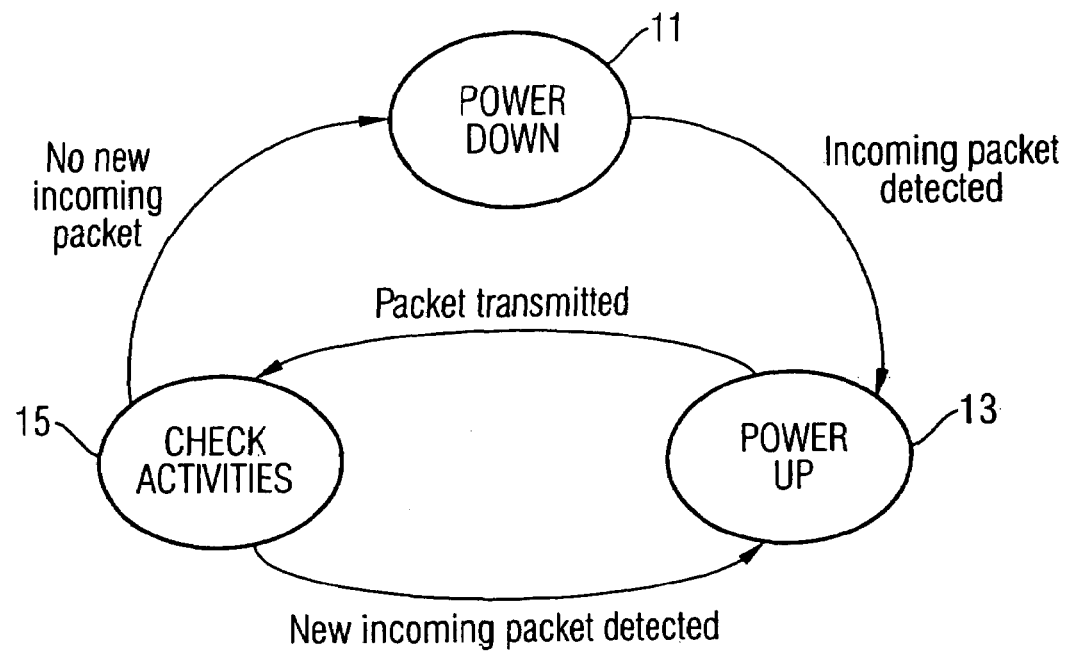
FIG. 2 shows a first state diagram of the switch of FIG. 1.

A state diagram describing the operations of each of the MAC_RX portion of the MAC module and the RX module is shown in FIG. 2. Starting from the power down state 11, upon the control logic registering from the handshake signal that a packet is about to be received, it powers up the module (state 13). Upon the packet being transmitted, the module enters a state 15 in which the activities of the module are checked. If the result of state 15 is that no new packet is expected, then the system passes back to state 11. Conversely, if the check reveals that a new packet is expected, then the system passes back to state 13. Depending upon how the RX module is designed (e.g. as a pipeline design), the check of step 15 can be done in one of a number of ways. One way is for the RX module to include a status register or flag which stores a value indicative of the number of incoming handshake signals which have not yet led to outgoing packets. The RX module should only be turned off if this is zero. The value may be incremented whenever a new handshake signal arrives, and decremented whenever one is transmitted. An alternative way of performing the check of step 15 would be for the RX module to check the state of the interface on the incoming side. The state diagram of FIG. 2 makes it possible to achieve power up and/or power down within one clock cycle.

The switch engine 7 requires a more complex power-down mechanism. When it has received a power up signal from any of the n interfaces 5, its logic circuit turns it turns on (if it was not on already). Furthermore, it remains on for as long as there are any packets in the packet buffer. The switching engine 7 only powers down when there are no packets stored within it and when it has received no power up signal indicating that any further packets are on the way.

Figure 3:
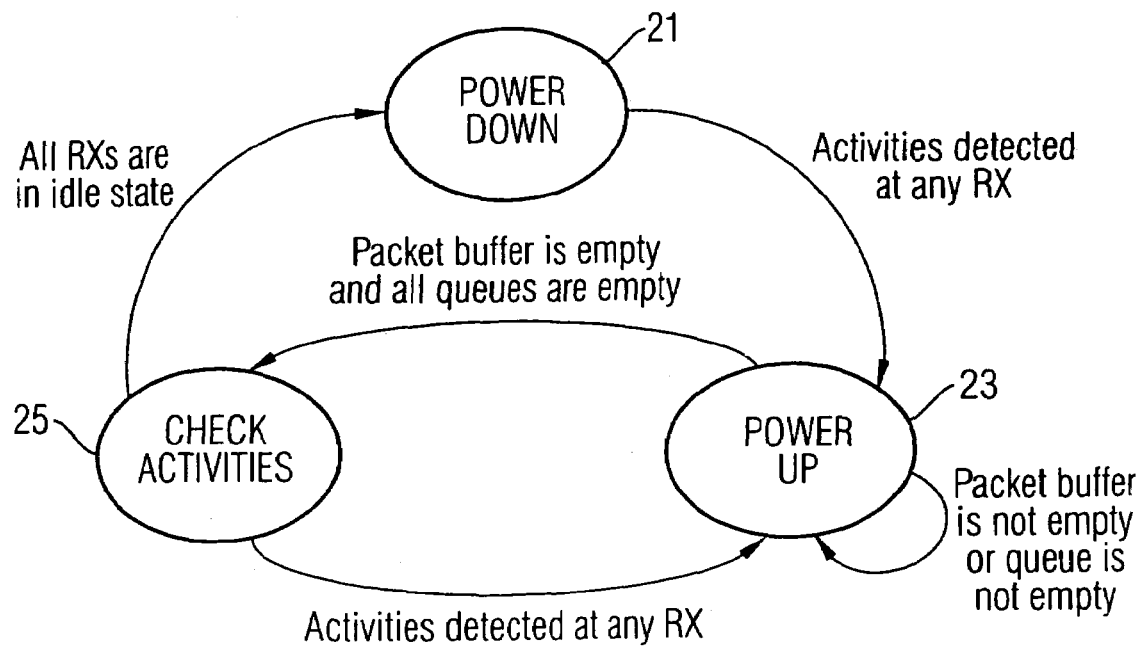
FIG. 3 shows a second state diagram of the switch of FIG. 1.

A state diagram for the switching engine 7 is shown in FIG. 3. Suppose that the switch is in a powered down state 21. Upon its control circuit receiving a handshake signal from any of the RX modules, it passes to the power up state 23. In remains in this state so long as the packet buffer and/or any of the output queues contain at least one data packet. Upon the packet buffer and all of the output queues being empty, the system passes to state 25, in which it is detected whether any of the RX modules is about to send a packet. This check may be performed in a way analogous to the RX module described above, e.g. using a register to record the number of incoming handshake signals (if any) which have not yet led to transmitted packets. If this is not the case, the switching engine 7 returns to the power down state 21. Otherwise, it returns to the power up state 23.

When the QM of the switching engine 7 is ready to transmit a packet to a given output port, then according to the mechanism of known Ethernet switches, it transmits a first handshake signal to the corresponding TX module. The logic circuit of that TX module recognises this signal, and powers up the TX module (if it was not powered up already). The TX module goes off when the entire packet has been transferred out of the TX module (and only in the case that it receives no new power up signal from the switching engine 7 before this transfer is completed). Similarly, the MAC_TX module is arranged to power up automatically when its control logic detects the first handshake signal from the TX module, and the MAC_TX module is arranged to power down automatically when the entire packet has been transferred to the corresponding PHY module (and only in the case that it receives no new power up signal from the corresponding TX before completing the transfer). The state diagram of FIG. 2 describes also the processes operated within the TX module and the MAC_TX module of the MAC module.

In the above embodiment, power is saved at every module in the system by capitalizing on the fact that the Ethernet traffic is bursty, and comes in as packets. Furthermore, the powering down and up of the modules is performed straightforwardly by decoding the handshaking signals which are readily available in a prior art switch.

Although only a single embodiment of the invention has been described, the invention is not limited in this respect and many variations are possible within the scope of the invention as will be clear to a skilled reader. For example, in other embodiments of the invention it may be the case that not all of the modules of the switch are arranged to power down. For example, if the number n of channels is high it may be the case that there are very few times at which the switching engine 7 can be powered down. For this reason, it may be that the switching engine 7 is not arranged to have the power up/down features described above. Alternatively, an additional control logic may be provided to determine whether the switching engine, and/or any other module(s), are permitted to be powered up/down according to whether one or more criteria are met. These criteria may for example be based on the number of the channels which are in use, and/or measured statistical properties of the data flow.

Alternatively or additionally, FIG. 2 and/or 3 may be varied to include gaps of one or more cycles in which the modules remain powered up even after they have finished transmitting any packet(s) within them. This provides a margin of safety, and thus reduces the chance of a glitch in the system leading to the loss or delay of any packet.

In further variations of the invention, whereas the switching engine 7 of FIG. 1 is associated with a logic circuit which turns the entire switching engine 7 on, it is possible to envisage embodiments in which the various modules within the switching engine are individually turned on and off according to whether they are needed for processing data packets.

Conversely, it is possible for more than of the modules of FIG. 1 to be turned on and off together, i.e. treated as a single module. For example, the MAC unit of FIG. 1 could be arranged with a single logic circuit for turning the MAC on whenever either of the MAC_RX or MAC_TX modules is required, and turning the entire MAC off when neither of the MAC_RC or MAC_TX modules is required. Although this form of the MAC would have a more complex state diagram than that shown in FIG. 2, such a design could be advantageous from the point of view of reducing the number of logic circuits required by the embodiment.

Furthermore, it is not necessary that the respective logic circuits of multiple modules are separate from each other. Rather, there may be a single power control module which is responsible for individually switching on (and optionally also switching off) more than one of the modules according to the presence of data packets in the data switch. This power control module preferably receives the handshake signals transmitted to all the modules which it is intended to control.

The invention claimed is:

1. A method of controlling a data switch, the method comprising:
providing a data switch having a plurality of input/output ports and a switching engine, the plurality of input/output ports and the switching engine each including at least one associated module which is operable to receive and pass on data packets, the switching engine being configured to selectively direct each incoming data packet to one or more of the output ports based on address information in the data packet, and
turning off and on the at least one module associated with at least one of the plurality of input/output ports and the switching engine based only on whether data packets are passing through the data switch, the at least one module associated with the at least one of the plurality of input/output ports and the switching engine being further associated with a respective one of a plurality of logic circuits which registers handshake signals transmitted to that module from one or more other modules of the switch, the handshake signals being indicative of the presence of data packets passing through the switch, the respective one of the plurality of logic circuits being arranged to turn on its associated module based on the handshake signals.

2. A method according to claim 1, wherein the respective one of the plurality of logic circuits determines whether all packets transmitted to its associated module have been dispatched, and when the determination is positive, turns the associated module off in the absence of any fresh data packets being transmitted to that module.

3. A method according to claim 1, wherein the data switch is operated based on a time signal, and said method includes: turning off the at least one module associated with the at least one of the plurality of input/output ports and the switching engine by disabling transmission of the clock signal to that module, and turning on the at least one module associated with the at least one of the plurality of input/output ports and the switching engine by enabling transmission of the clock signal to that module.

4. A method according to claim 2, wherein the data switch is operated based on a time signal, and said method includes: turning off the at least one module associated with the at least one of the plurality of input/output ports and the switching engine by disabling transmission of the clock signal to that module, and turning on the at least one module associated with the at least one of the plurality of input/output ports and the switching engine by enabling transmission of the clock signal to that module.

5. A data switch, comprising:
a plurality of input/output ports, and
a switching engine,
the plurality of input/output ports and the switching engine each including at least one associated module which is operable to receive and pass on data packets, the switching engine being configured to selectively direct each incoming data packet to one or more of the output ports based on address information in the data packet,
the at least one module associated with at least one of the plurality of input/output ports and the switching engine being associated with means for turning that module off and on based only on whether data packets are passing through the data switch,
the at least one module associated with the at least one of the plurality of input/output ports and the switching engine being further associated with a respective one of a plurality of logic circuits which registers handshake signals transmitted to that module from one or more other modules of the switch, the handshake signals being indicative of the presence of data packets passing through the switch, the respective one of the plurality of logic circuits being arranged to turn on its associated module based on the handshake signals.

6. A data switch according to claim 5, wherein the respective one of the plurality of logic circuits determines whether all packets transmitted to its associated module have been dispatched, and when the determination is positive, turns the associated module off in the absence of any fresh data packets being transmitted to that module.

7. A data switch according to claim 5, wherein said data switch is operated based on a clock signal, the at least one module associated with the at least one of the plurality of input/output ports and the switching engine being turned on by enabling transmission of the clock signal to that module and being turned off by disabling transmission of the clock signal to that module.

8. A data switch according to claim 6, wherein said data switch is operated based on a clock signal, the at least one module associated with the at least one of the plurality of input/output ports and the switching engine being turned on by enabling transmission of the clock signal to that module and being turned off by disabling transmission of the clock signal to that module.

9. A method of controlling a data switch, the method comprising:
providing a data switch for receiving data packets from and transmitting data packets to a plurality of channels, the data switch including a plurality of input/output ports coupled to a switching engine, each of the input/output ports including a physical module coupled to a corresponding channel, a receive buffer module coupled to the switching engine, a media access controller (MAC) receive module coupled between the physical module and the receive buffer module, a transmit buffer module coupled to the switching engine, a MAC transmit module coupled between the physical module and the transmit buffer module, the switching engine being configured to selectively direct each incoming data packet to one or more of the output ports based on address information in the data packet, and
turning ones of the MAC receive module, the receive buffer module, the transmit buffer module and the MAC transmit module off and on individually in dependence on the presence of data packets passing through the switch, ,
the MAC receive module being associated with a first logic circuit which registers a handshake signal transmitted to the MAC receive module from the physical module, the handshake signal being indicative of the presence of data packets passing to the MAC receive module, the first logic circuit being arranged to turn the MAC receive module on based on the handshake signal,
the receive buffer module being associated with a second logic circuit which registers a handshake signal transmitted to the receive buffer module from the MAC receive module, the handshake signal being indicative of the presence of data packets passing to the receive buffer module, the first logic circuit being arranged to turn the receive buffer module on based on the handshake signal,
the transmit buffer module being associated with a third logic circuit which registers a handshake signal transmitted to the transmit buffer module from the switching engine, the handshake signal being indicative of the presence of data packets passing to the transmit buffer module, the first logic circuit being arranged to turn the transmit buffer module on based on the handshake signal,
the MAC transmit module being associated with a fourth logic circuit which registers a handshake signal transmitted to the MAC transmit module from the transmit buffer module, the handshake signal being indicative of the presence of data packets passing to the MAC transmit module, the first logic circuit being arranged to turn the MAC transmit module on based on the handshake signal,
each of the MAC receive module, the receive buffer module, the transmit buffer module and the MAC transmit module being further associated with respective fifth, sixth, seventh and eighth logic circuits for determining when all packets transmitted to the module have been dispatched and at a time when the determination is positive, turning the module off in the absence of any fresh data packets transmitted to the module.

10. A data switch for receiving data packets from and transmitting data packets to a plurality of channels, the data switch comprising:
a plurality of input/output ports coupled to a switching engine, each of the input/output ports including a physical module coupled to a corresponding channel,
a receive buffer module coupled to the switching engine,
a media access controller (MAC) receive module coupled between the physical module and the receive buffer module,
a transmit buffer module coupled to the switching engine, and
a MAC transmit module coupled between the physical module and the transmit buffer module,
the switching engine being configured to selectively direct each incoming data packet to one or more of the output ports based on address information in the data packet,
the MAC receive module being associated with a first logic circuit which registers a handshake signal transmitted to the MAC receive module from the physical module, the handshake signal being indicative of the presence of data packets passing to the MAC receive module, the first logic circuit being arranged to turn the MAC receive module on based on the handshake signal,
the receive buffer module being associated with a second logic circuit which registers a handshake signal transmitted to the receive buffer module from the MAC receive module, the handshake signal being indicative of the presence of data packets passing to the receive buffer module, the first logic circuit being arranged to turn the receive buffer module on based on the handshake signal,
the transmit buffer module being associated with a third logic circuit which registers a handshake signal transmitted to the transmit buffer module from the switching engine, the handshake signal being indicative of the presence of data packets passing to the transmit buffer module, the first logic circuit being arranged to turn the transmit buffer module on based on the handshake signal,
the MAC transmit module being associated with a fourth logic circuit which registers a handshake signal transmitted to the MAC transmit module from the transmit buffer module, the handshake signal being indicative of the presence of data packets passing to the MAC transmit module, the first logic circuit being arranged to turn the MAC transmit module on based on the handshake signal,
each of the MAC receive module, the receive buffer module, the transmit buffer module and the MAC transmit module being further associated with respective fifth, sixth, seventh and eighth logic circuits for determining when all packets transmitted to the module have been dispatched and at a time when the determination is positive, turning the module off in the absence of any fresh data packets transmitted to the module.

* * * * *